United States Patent
Vauchel et al.

(10) Patent No.: US 8,464,512 B2
(45) Date of Patent: Jun. 18, 2013

(54) ACTUATOR FOR AN AIRCRAFT NACELLE MOBILE STRUCTURE, AND NACELLE COMPRISING AT LEAST ONE SUCH ACTUATOR

(75) Inventors: Guy Vauchel, Le Havre (FR); Jean-Philippe Joret, Beuzeville (FR); Pierre Baudu, Criquetot L'Esneval (FR); Christophe Guenadou, Le Havre (FR)

(73) Assignee: Aircella, Lonfreville l'Orcher ( * ) Notice: Subject to any disclaimer, the term of this patent is extended or adjusted under 35 U.S.C. 154(b) by 723 days.

(21) Appl. No.: 12/682,139

(22) PCT Filed: Sep. 12, 2008

(86) PCT No.: PCT/FR2008/001279
§ 371 (c)(1), (2), (4) Date: Apr. 8, 2010

(87) PCT Pub. No.: WO2009/090319
PCT Pub. Date: Jul. 23, 2009

(65) Prior Publication Data
US 2010/0218480 A1    Sep. 2, 2010

(30) Foreign Application Priority Data
Oct. 8, 2007  (FR) ..................... 07 07048

(51) Int. Cl.
*F02K 1/54*  (2006.01)
*F02K 1/64*  (2006.01)

(52) U.S. Cl.
USPC .......... 60/226.2; 60/226.1; 60/226.3; 60/262; 60/771; 60/232; 239/265.11; 239/265.19; 239/265.23; 239/265.31; 239/265.33

(58) Field of Classification Search
USPC ............... 60/226.1, 226.2, 226.3, 262, 232, 60/770, 771, 796, 799; 239/265.11, 265.19, 239/265.23, 265.29, 265.31, 265.33
See application file for complete search history.

(56) References Cited

U.S. PATENT DOCUMENTS 4,216,909 A * 8/1980 Carlin ...................... 239/265.31
4,793,134 A * 12/1988 Coplin et al. ................ 60/226.1
(Continued)

FOREIGN PATENT DOCUMENTS

| EP | 0267078 | 5/1988 |
|---|---|---|
| EP | 0853192 | 7/1998 |
| EP | 0884470 | 12/1998 |
| EP | 1239139 | 9/2002 |
| GB | 1386232 | 3/1975 |

OTHER PUBLICATIONS

International Search Report; PCT/FR2008/001279; May 25, 2009.

*Primary Examiner* — Phutthiwat Wongwian
*Assistant Examiner* — Steven Sutherland
(74) *Attorney, Agent, or Firm* — Brinks Hofer Gilson & Lione

(57) ABSTRACT

This actuator for an aircraft engine nacelle mobile structure (9) comprises a motor (1) intended to be mounted on a fixed part of the said nacelle, an endless screw (21) able to be turned by this motor (1), a slideway (5) intended to be connected to the said mobile structure (9) and comprising a nut (29) in mesh with the said endless screw, and a first ball end (15) allowing an angular offset between the axis of the said endless screw (21) and the said slideway (5). This actuator is notable in that it comprises a sleeve (19) able to accommodate the said screw (21) and extending with clearance inside the said slideway (5), the said nut (29) being mounted on that end of the said sleeve (19) that is closest to the said motor (1), and the said first ball end being interposed between the other end of the said sleeve (19) and the said slideway (5).

9 Claims, 2 Drawing Sheets

U.S. PATENT DOCUMENTS 5,090,197 A * 2/1992 Dubois ........................ 60/226.2
5,211,008 A * 5/1993 Fage ............................ 60/226.2
5,996,937 A * 12/1999 Gonidec et al. ........... 244/110 B
6,170,254 B1   1/2001 Cariola

* cited by examiner

ACTUATOR FOR AN AIRCRAFT NACELLE MOBILE STRUCTURE, AND NACELLE COMPRISING AT LEAST ONE SUCH ACTUATOR

TECHNICAL FIELD

The present invention relates to an actuator for an aircraft nacelle mobile structure, and to a nacelle comprising at least one such actuator.

BACKGROUND

European patent EP 1 239 139 in the name of the applicant company discloses an actuator for an aircraft engine nacelle mobile structure, comprising a motor intended to be mounted on a fixed part of said nacelle, an endless screw able to be turned by this motor, a slide intended to be connected to said mobile structure and comprising a nut in mesh with said endless screw, and a ball joint allowing some angular offset between the axis of said endless screw and the direction of travel of said slide.

In this actuator of the prior art, the ball joint prevents the shaft of the motor and the endless screw being subjected to excessively high stress if the slide is misaligned in relation to the motor.

BRIEF SUMMARY

The disclosure seeks to improve the way in which the actuator behaves in the face of such misalignment.

The disclosure further seeks to provide a simple solution for fitting the nut in the slide and to make the operations of mounting the mobile structure with respect to the fixed part of the nacelle and of removing it therefrom, easier.

More specifically, the disclosure provides an actuator for an aircraft engine nacelle mobile structure, comprising a motor intended to be mounted on a fixed part of said nacelle, an endless screw able to be turned by this motor, a slide intended to be connected to said mobile structure and comprising a nut in mesh with said endless screw, and a first ball joint allowing some angular offset between the axis of said endless screw and said slide, notable in that it comprises a sleeve able to accept said screw and extending with clearance inside said slide, said nut being mounted on the end of said sleeve closest to said motor, and said first ball joint being interposed between the other end of said sleeve and said slide.

The fact that the first ball joint is separate from the nut and situated at the end of the sleeve furthest from the motor means that this ball joint will always be situated a distance from the motor that is at least equal to the length of the endless screw.

As a result, the angle between the axis of the endless screw and the direction of travel of the slide can be minimized in the event that this slide is misaligned in relation to the motor, and the stresses imposed on the endless screw, on the motor and on the mobile structure itself can thus be reduced.

It will also be noted that mounting the nut on a sleeve which is itself mounted inside the slide, is an easy solution to mounting the nut on the slide, it being possible for this nut to be of standard or assisted (for example ball-nut) design.

According to other optional features of the actuator according to the invention:
  said first ball joint is interposed between said other end of the sleeve and a foot end itself mounted inside said slide: this foot end is an intermediate member making mounting the sleeve inside the slide easier;
  said foot end is connected to said sleeve by a removable key: the presence of such a key makes the operations of mounting the foot end in the slide and removing it therefrom easier;
  said first ball joint is connected to said foot end by a removable pin: the presence of such a pin makes the operations of mounting the first ball joint on the foot end and removing it therefrom easier;
  this actuator comprises a second ball joint interposed between said motor and said endless screw: the presence of this second ball joint plays a part in making the connection between the motor and the slide more flexible and therefore in relieving the endless screw and this motor in particular of the loads liable to be generated by any misalignment of the slide in relation to the motor;
  said second ball joint is connected to said motor by a removable connecting member such as a pin: the presence of such a connecting member makes the operations of mounting the second pin on the motor and removing it therefrom easier.

The present invention also relates to an aircraft engine nacelle comprising a fixed part and at least one structure mounted such that it can move on this fixed part, notable in that it comprises at least one actuator according to the foregoing, interposed between said fixed part and said mobile structure.

According to other optional features of this nacelle:
  said mobile structure is a mobile cowl of a cascade-type thrust reverser,
  said mobile structure is a door of a door-type thrust reverser.

BRIEF DESCRIPTION OF THE DRAWINGS

Other features and advantages of the present invention will become apparent from reading the description which follows and from studying the attached figures in which.

DETAILED DESCRIPTION

Figure 1:
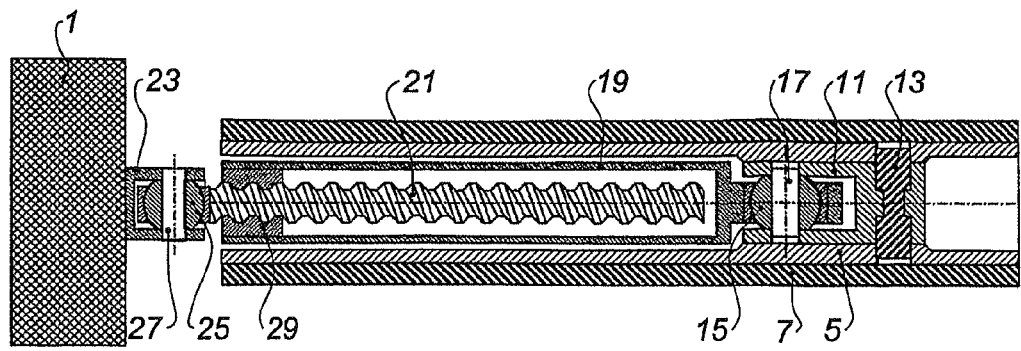
FIG. 1 is a view in axial section of an actuator according to the invention.

Reference is made to FIG. 1 which shows that the actuator according to the invention comprises an electric motor 1 intended to be mounted on an aircraft engine nacelle fixed part, such as a cascade-type thrust reverser front frame (known per se).

Figure 5:
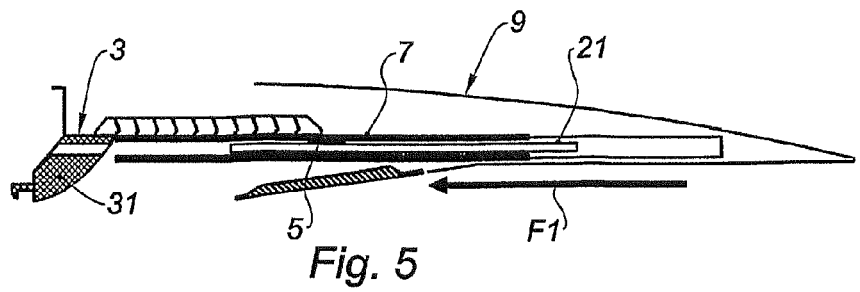
Figure 6:
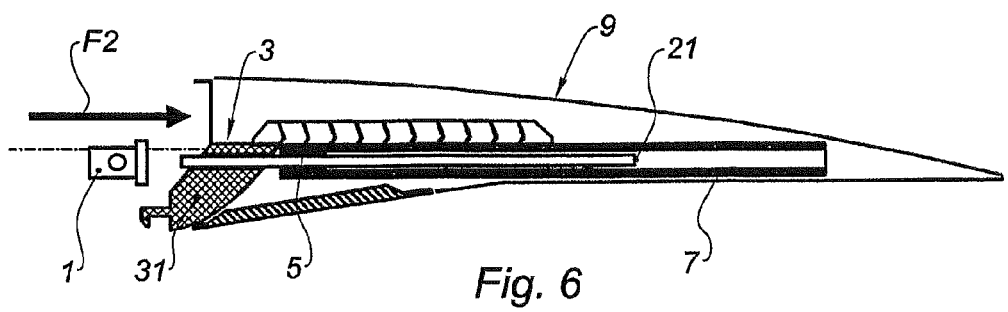

A front frame such as this is depicted with the reference 3 in FIGS. 5 and 6.

The actuator according to the invention also comprises a slide 5 slidably mounted inside a rail 7 secured to a structure mounted such that it can move in relation to the fixed structure of the nacelle.

A mobile structure such as this may, for example, be a cascade-type thrust reverser sliding cowl 9 as depicted in FIGS. 5 and 6.

Mounted inside the slide 5 is a component forming a foot end 11, a key 13 passing both through the slide 5 and the foot end 11 to join these components together.

Mounted inside the foot end 11 is a first ball joint 15 through which a pin 17 passes.

Mounted on this ball joint 15, with three degrees of freedom and with clearance in relation to the inside of the slide 5, is a sleeve 19 that accepts an endless screw 21, itself connected to the shaft 23 of the motor 1 by a second ball joint 25 secured to this shaft 23 by means of a pin 27.

At the end of the sleeve 19 closest to the motor 1 there is a nut 29 fixed to this sleeve, and collaborating with the flight of the endless screw 21.

The way in which the actuator which has just been described works and the advantages it presents are as follows:

Under the effect of the turning of the electric motor 1, the endless screw 21 turns, by virtue of which the nut 29 and therefore the sleeve 19 and the slide 5 effect a translational movement inside the rail 7.

The fact that the first ball joint 15 is separated from the motor 1 by a length at least equal to that of the endless screw 21 makes it possible to minimize the angle between the axis of the endless screw 21 and the direction of travel of the slide 5 if this slide is misaligned in relation to the motor.

The presence of two ball joints 15 and 25 in the drive train between the motor 1 and the slide 5 increases the flexibility of this drive train in relation to any misalignments of the slide relative to the motor.

It will be noted that the fact that the nut 29 is mounted on a sleeve 19 which is itself fitted inside the slide 5 using a key by way of the foot end 11 offers an elegant solution to the mounting of this nut on this slide.

Figure 2:
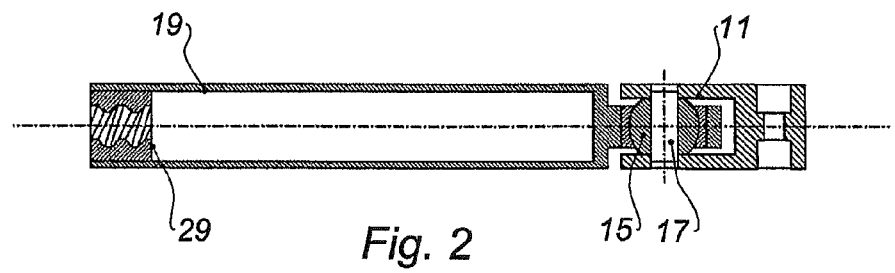
FIGS. 2 to 4 depict intermediate steps in mounting the actuator of FIG. 1, FIGS. 5 and 6 depict the steps of mounting a cascade-type thrust reverser sliding cowl on the front frame of this reverser, at least one actuator according to the invention being interposed between this cowl and this frame.
Figure 3:
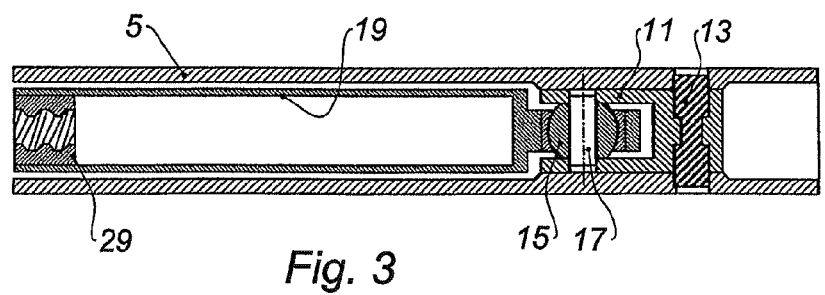
Figure 4:
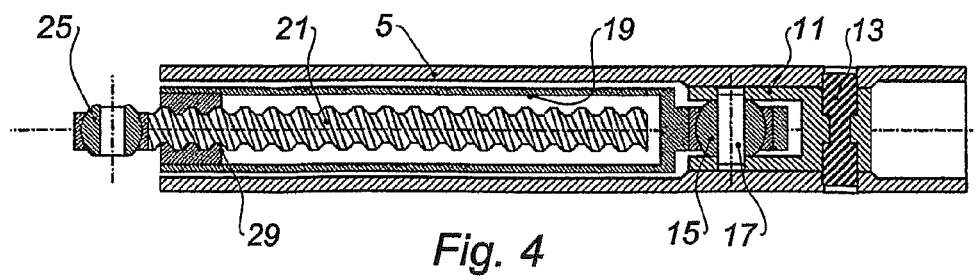

The way in which the actuator according to the invention is assembled can be understood from studying FIGS. 2 to 4.

As can be seen in FIG. 2, the starting point is to mount the sleeve 19 equipped with its nut 29 on the foot end 11 via the first ball joint 15 (FIG. 2).

Next, the assembly thus obtained is positioned inside the slide 5, and the key 13 is introduced into the slide 5 and the foot end 11 in such a way as to immobilize these two components relative to one another (FIG. 3).

The endless screw 21 equipped with its ball joint 25 is then positioned inside the nut 29 (FIG. 4).

Finally, the assembly thus obtained is fixed to the shaft 23 of the electric motor 1 using the pin 27 that passes through the ball joint 25 (see FIG. 1).

As can be appreciated in the light of the foregoing, the various parts that make up the actuator according to the invention may be assembled with one another very simply, using a key and pins.

FIGS. 5 and 6 show how an actuator like the one described hereinabove can be installed on a cascade-type thrust reverser, this thrust reverser comprising, as stated earlier, on the one hand, a fixed part 3 comprising a front frame and, on the other hand, at least one mobile part 9 comprising a sliding cowl.

In this example, the guide rails 7 are secured to the front frame 3.

Once the slide 5 equipped with its sleeve 19 (not visible) and with its endless screw 21 have been mounted on the cowl 9, the sliding cowl 9 is positioned on the front frame 3 in such a way that the slide 5 engages inside the guide rail 7.

The sliding cowl 9 is then slid forward, that is to say in the direction of the arrow F1 visible in FIG. 5.

This sliding is continued until the end of the endless screw 21 passes through part 31 of the front frame 3.

The electric motor 1 is then fixed to this end of the screw 21 as indicated by the arrow F2 in FIG. 6.

It is interesting to note that, with the actuator according to the invention, there is no need to provide special adjustment between the electric motor 1 and the drive nut 29 because, through its very nature, the endless screw 21 has no predetermined angular position and can therefore automatically positions itself to suit the angular positioning of the nut.

Figure 7:
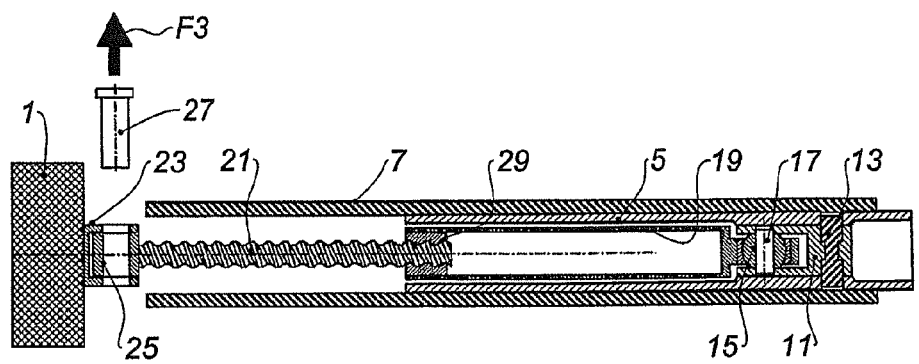
FIGS. 7 and 8 depict two steps in removing an actuator according to the invention.
Figure 8:
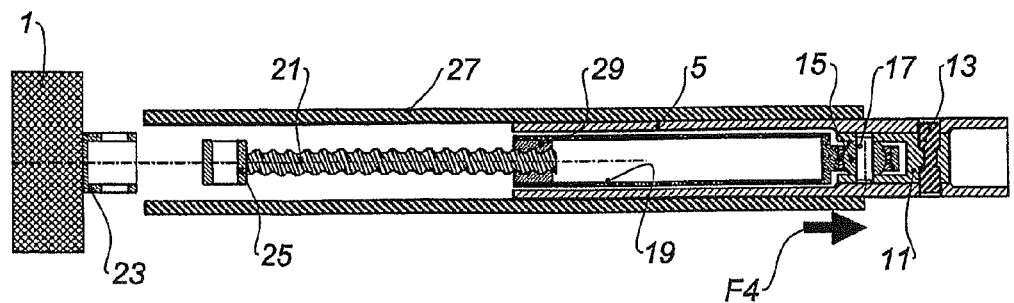

Should the endless screw 21 become seized inside the nut 29, with the likelihood of causing the cowl 9 to jam relative to the front frame 3, all that is required is the removal of the pin 27 that connects the endless screw 21 to the electric motor 1, as can be seen in FIG. 7 and as indicated by the arrow F3, by virtue of which the cowl 9 can easily be slid in the downstream direction, that is to say in the direction of the arrow F4 indicated in FIG. 8, thus allowing the slide 5 to be disengaged from the guide rail 7 and allowing work to be performed on and/or exchange of the sleeve 1 and/or the endless screw and/or the nut 29, for example.

It will therefore be understood that the actuator according to the invention is particularly easy to maintain.

Of course, the present invention is not in any way restricted to the embodiment described and depicted, which has been provided simply by way of example.

Thus, it should be understood that the term "ball joint" used in this patent covers any connecting system equivalent to a mechanical ball joint, that is to say any system of connection that allows two degrees of rotational freedom.

Such connecting systems may, for example notably comprise cardan joint systems or alternatively elastic coupling members of the "Paulstra" type, for example.

The invention claimed is:

1. An actuator for an aircraft engine nacelle mobile structure, comprising:
    a motor intended to be mounted on a fixed part of said nacelle,
    an endless screw able to be turned by this motor,
    a slide intended to be connected to said mobile structure,
    a nut in mesh with said endless screw,
    a first ball joint allowing some angular offset between the axis of said endless screw and said slide, and
    a sleeve able to accept said screw and extending with clearance inside said slide,
    wherein said nut being mounted on the end of said sleeve closest to said motor, and said first ball joint being interposed between the other end of said sleeve and said slide.

2. The actuator as claimed in claim 1, wherein said first ball joint is interposed between said other end of the sleeve and a foot end (11) itself mounted inside said slide (5).

3. The actuator as claimed in claim 2, wherein said foot end is connected to said sleeve by at least one removable key.

4. The actuator as claimed in claim 2, wherein said first ball joint is connected to said foot end by a removable pin.

5. The actuator as claimed in claim 1, further comprising a second ball joint interposed between said motor and said endless screw.

6. The actuator as claimed in claim 5, wherein said second ball joint is connected to said motor by a removable connecting member such as a pin.

7. An aircraft engine nacelle comprising a fixed part and at least one structure mounted movably on the fixed part, comprising at least one actuator as claimed in claim 1, interposed between said fixed part and said mobile structure.

8. The nacelle as claimed in claim 7, wherein said mobile structure is a mobile cowl of a cascade-type thrust reverser.

9. The nacelle as claimed in claim 7, wherein said mobile structure is a door of a door-type thrust reverser.

* * * * *